May 9, 1944. L. S. FRYER ET AL Re. 22,474
PROCESS AND APPARATUS FOR CONTROLLING TENSION
Original Filed March 22, 1937 3 Sheets-Sheet 1
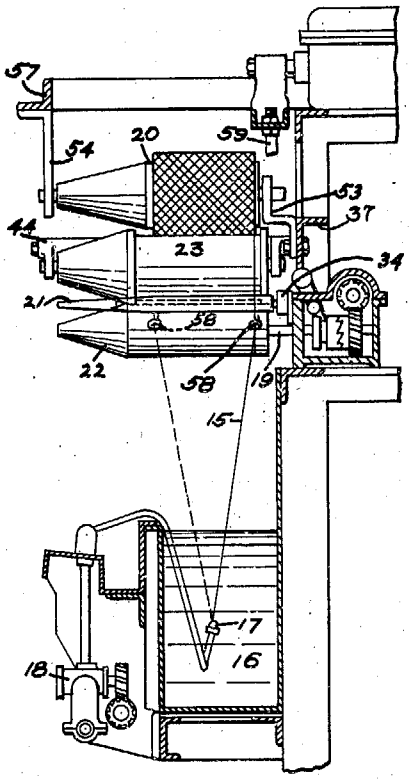
FIG. 2
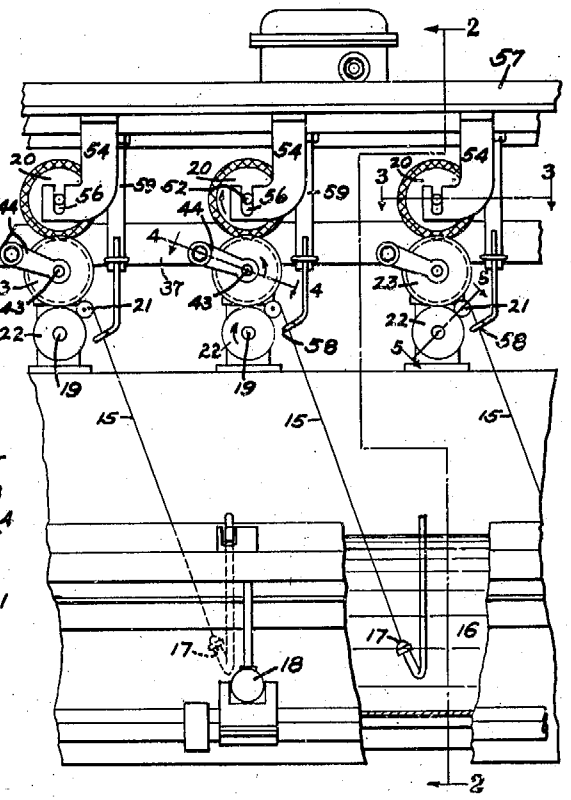
FIG. 1
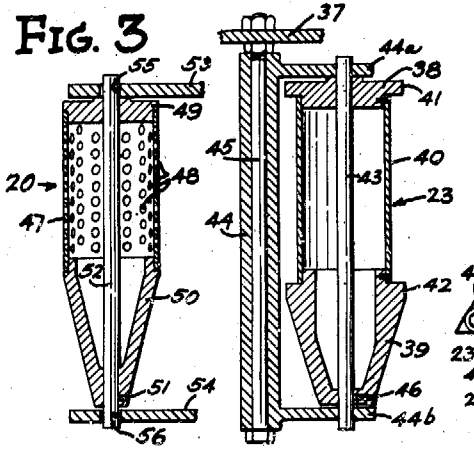
FIG. 3
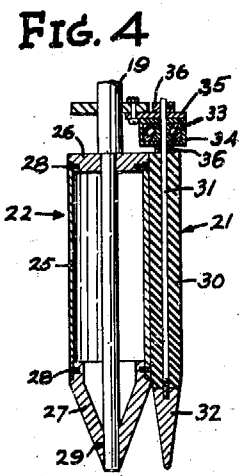
FIG. 4
FIG. 5
Inventor
LOUIS S. FRYER AND
LOUIS E. LOVETT
By Charles D. Herrstrom
Attorney May 9, 1944. L. S. FRYER ET AL Re. 22,474

PROCESS AND APPARATUS FOR CONTROLLING TENSION

Original Filed March 22, 1937 3 Sheets-Sheet 2

INVENTOR
LOUIS S. FRYER AND
LOUIS E. LOVETT
BY
Charles E. Herrstrom
ATTORNEY

May 9, 1944. L. S. FRYER ET AL Re. 22,474

PROCESS AND APPARATUS FOR CONTROLLING TENSION

Original Filed March 22, 1937 3 Sheets-Sheet 3

INVENTOR
LOUIS S. FRYER AND
LOUIS E. LOVETT
BY
Charles E. Herrstrom
ATTORNEY

Reissued May 9, 1944

Re. 22,474

UNITED STATES PATENT OFFICE 22,474

PROCESS AND APPARATUS FOR CONTROLLING TENSION

Louis S. Fryer, Cleveland, and Louis E. Lovett, Madison, Ohio, assignors to Industrial Rayon Corporation, Cleveland, Ohio, a corporation of Delaware Original No. 2,217,862, dated October 15, 1940, Serial No. 132,266, March 22, 1937. Application for reissue October 14, 1942, Serial No. 461,950

19 Claims. (Cl. 242—45)

This invention relates to apparatus for controlling tensile stresses on threads and, more particularly, to apparatus adapted to tension or slacken threads which are being coiled or otherwise wound in package form. The invention is of especial value in connection with the production of viscose artificial silk thread, for which reason it will be shown and described in such association. However, it is to be understood that artificial silk thread otherwise produced, as, for example, by the cuprammonium, cellulose nitrate, or cellulose acetate processes, may be handled by means of such apparatus. The invention may also be utilized in connection with the production of threads, yarns or bands of any other material, whether of synthetic or natural origin.

In the production of artificial silk thread, it is sometimes desirable to tension the thread, as, for example, to enhance the tensile strength of the product. At other stages in its production, it is often desirable to effect a slackening of the thread in order to relieve any tensile stresses which occur therein; for instance, in coiling or otherwise winding such thread into a package, it is desirable that the package be of relatively loose formation in order that washing, desulphurizing, bleaching and other treating liquids may pass more readily through the windings thereof. In either case, it is important that the degree of tension or slackness imparted to the thread be uniform, this for the reason that variations may adversely affect the dyeing properties of the product. By means of the present invention, the thread may be uniformly tensioned or slackened to any desired degree.

Several possible applications of the invention are illustrated in the accompanying drawings in which Figure 1 is a front elevation of a portion of a spool-spinning machine embodying one form of apparatus of the invention.

Figure 2 is a sectional elevation on the line 2—2 of Figure 1.

Figure 3 is a horizontal section on an enlarged scale along the line 3—3 of Figure 1.

Figure 4 is a section on an enlarged scale along the line 4—4 of Figure 1.

Figure 5 is a section on an enlarged scale along the line 5—5 of Figure 1.

Figures 6, 7, 8, 9, 10, 11:
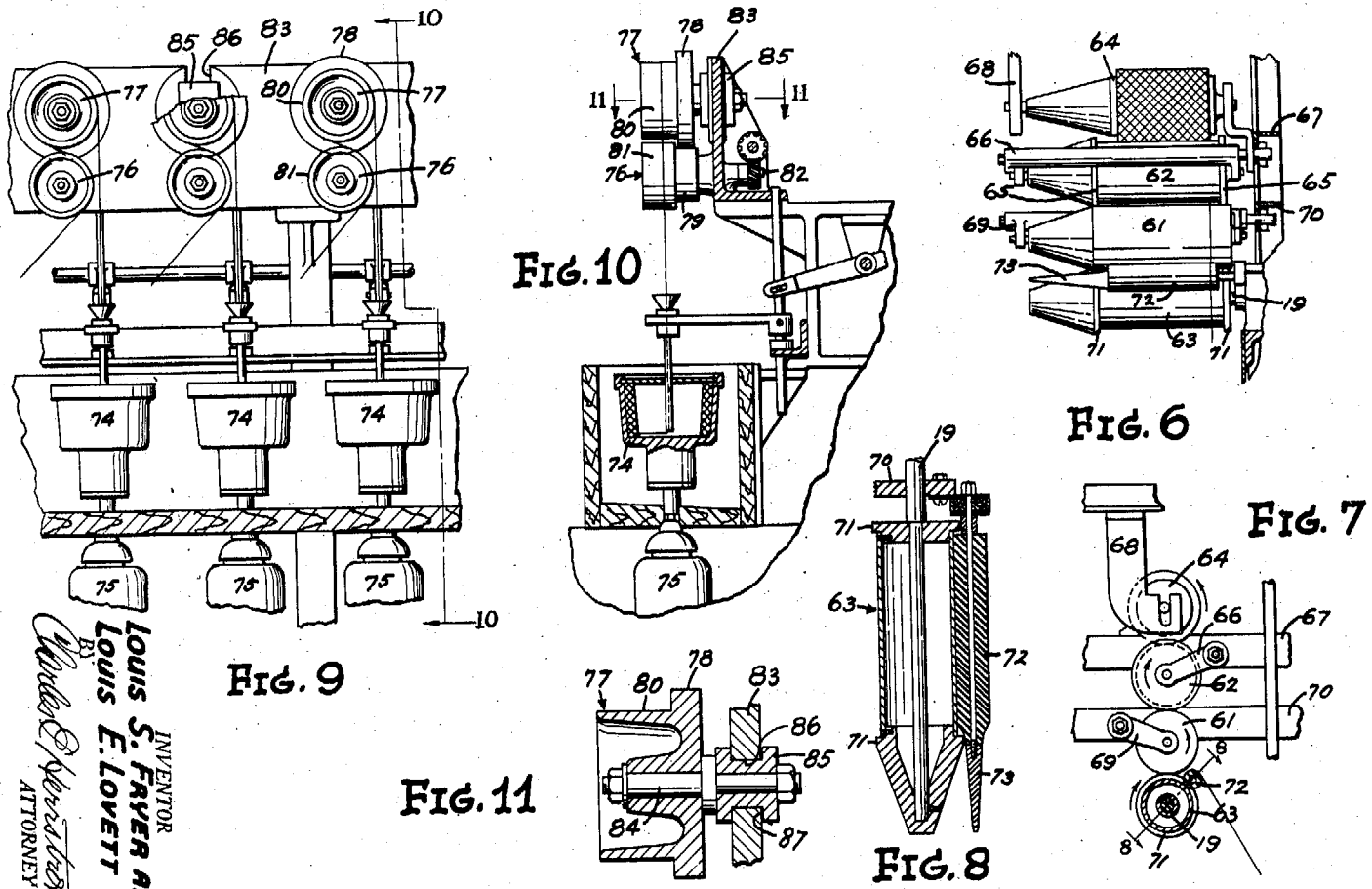
Figure 6 is a side elevation of a modified form of apparatus which may be employed in lieu of that appearing in Figures 1 and 2.
Figure 7 is an end elevation of the device of Figure 6, parts being shown as broken away for the sake of clearness.
Figure 8 is a section on an enlarged scale along line 8—8 of Figure 7.
Figure 9 is a front elevation of a portion of a pot-spinning machine embodying the invention.
Figure 10 is a sectional elevation on the line 10—10 of Figure 9.
Figure 11 is a horizontal section on an enlarged scale on the line 11—11 of Figure 10.

In the spool-spinning machine illustrated in Figures 1 and 2, the thread 15 is formed in the usual manner by coagulation of the viscose in bath 16, the viscose being extruded from spinneret 17 by pump 18. In conventional spinning machines, the thread is ordinarily collected immediately upon a spool mounted upon driven shaft 19. In accordance with the present invention, the thread, before being wound upon collecting roller 20, passes over pressure roller 21, under driven roller or godet 22, and partially around idler roller 23. As hereinafter pointed out, the apparatus is so arranged that the thread may be wound upon collecting roller 20 with the same degree of tension or of slackness that characterizes it while it is passing around idler roller 23.

Pressure roller 21 is provided in order to prevent slippage of the thread, which is looped around substantially the entire surface of driven roller 22. Withdrawal of the thread from the coagulating bath 16 being effected by driven roller 22, slippage of the thread thereon must be avoided if a uniform product is to be obtained. Pressure roller 21 operates to prevent slippage by applying the thread to driven roller 22 with a high degree of pressure. The resulting friction between the thread and driven roller 22 assures a positive and uniform pull on the thread.

As shown in Figure 5, pressure roller 21 includes a cylindrical body 30, preferably made of rubber or some other resilient material, suitably mounted upon shaft 31. Secured as by screw threads upon the free end of shaft 31 is an end piece 32 which may conveniently be of metal. The exterior of end piece 32 is of frusto-conical formation and merges into the contiguous portion of cylindrical body 30. Shaft 31 is rotatable in antifriction bearings 33 carried in a protecting housing 34 supported by bracket 35 from the frame of the machine. Collars 36 secured to shaft 31 on opposite sides of bearing 33 prevent endwise movement of the shaft.

To make driven roller 22 as light as possible consistent with the requisite amount of strength, it is preferably of hollow construction as shown in Figure 5. To this end, a cylindrical sleeve 25 is mounted upon end pieces 26 and 27 and secured thereto by screws 28. End piece 27 has a frusto-conical surface the outer portion of the base of which is of the same diameter as the exterior of cylindrical sleeve 25. In order that the surface of cylindrical sleeve 25 may be flush with the outer portions of end pieces 26 and 27, the receiving portions of these end pieces are formed in each case with a rabbet in which such sleeve seats. Shaft 19 passes centrally through end pieces 26 and 27 and is secured to end piece 27 by a set screw 29. Roller 22 is so mounted upon shaft 19 that frusto-conical end piece 27 is presented to the operator at the front of the machine.

As shown in Figure 4, idler roller 23 may have substantially the same construction as driven roller 22. In the case of idler roller 23, however, end pieces 38 and 39 project outward beyond the periphery of cylindrical sleeve 40 to form what are in effect flanges 41 and 42 of equal diameter. The outer portion of end piece 39 near the base thereof is of the same diameter as flange 42. The peripheries of flanges 41 and 42 are adapted to bear upon the cylindrical surface of driven roller 22. Contact with driven roller 22 serves to drive idler roller 23.

Shaft 43, upon which end pieces 38 and 39 are mounted, is preferably supported between the arms 44*a* and 44*b* of a pivoted bracket 44. Bracket 44 is carried on a shaft 45 secured to a longitudinal rail 37 forming part of the framework of the spinning machine. To assemble idler roller 23 in position between the arms of bracket 44, the roller is first positioned between the arms after which the shaft 43 is thrust in place. Set screw 46, mounted in end piece 39, serves to prevent endwise movement of shaft 43 and thereby retains idler roller 23 in position. The pivotal mounting of bracket 44 permits idler roller 23 to move up and down to compensate for inaccuracies in the mounting or in the surfaces of rollers 22 and 23 and further facilitates threading up of the rollers as hereinafter explained.

Due to the fact that the surface of cylindrical sleeve 40 is of smaller diameter than flanges 41 and 42, the surface of cylindrical sleeve 40 moves at a slower peripheral speed than the surfaces of flanges 41 and 42. The surfaces of flanges 41 and 42 move at the same linear speed as the surface of cylindrical sleeve 25 of roller 22 in consequence of the direct contact between these surfaces. As a result of this relationship, the surface of cylindrical sleeve 40 moves at a slower peripheral speed than the peripheral speed of the surface of cylindrical sleeve 25. Consequently, in the operation of rollers 22 and 23 thread will be delivered from the surface of driven roller 22 at a greater speed than it will be taken up by the surface of idler roller 23 and tension in the thread will be relieved. In this manner, it is possible to relieve the thread of tension placed upon it as it is drawn from coagulating bath 16 by driven roller 22.

Collecting roller 20, as shown in Figure 3, is made up of several elements corresponding to those of driven roller 22. Cylindrical sleeve 47, however, is perforated in the usual way with a considerable number of holes 48. These holes permit the passage of fluid through cylindrical sleeve 47 and through the layers of thread collected thereon in the washing, desulphurizing, bleaching or other treating of the thread. Cylindrical sleeve 47 may be removably attached to end pieces 49 and 50 and prior to liquid processing of the thread may be removed therefrom exactly as the ordinary spool is removed for such purposes. End piece 50 has a frusto-conical surface and is fastened to shaft 52 by set screw 51.

The ends of shaft 52 of collecting roller 20 are mounted in brackets 53 and 54. Bracket 53 is fastened to rail 37, while bracket 54 depends from a rail 57 extending longitudinally of the spinning machine. Upwardly opening slots 55 and 56 in these brackets receive the ends of shaft 52. In locating collecting roller 20 between brackets 53 and 54, cylindrical sleeve 47 is first placed upon end piece 50, after which end piece 49 is passed over shaft 52 and brought into contact with cylindrical sleeve 47. This assembly is then dropped in place between the brackets 53 and 54. Inasmuch as collecting roller 20 closely fits the space between the brackets, separation of end pieces 49 and 50 will be prevented and the parts of collecting roller 20 maintained in assembled relation.

Upwardly opening slots 55 and 56 permit rapid removal from brackets 53 and 54 of the assembly including collecting roller 20 and enable an empty collecting roller upon which fresh thread may be collected to be quickly placed in position. These slots furthermore permit collecting roller 20 to move upward upon increase in the thickness of the package of thread. Also, any inaccuracies which exist in the mounting or formation of collecting roller 20 or idler roller 23 will be compensated for by vertical slots 55 and 56.

Flanges 41 and 42 of idler roller 23 should be far enough apart to permit the surface of cylindrical sleeve 47 of collecting roller 20 to come into contact with the surface of cylindrical sleeve 40 of idler roller 23. This permits the frusto-conical surface of end piece 50 of collecting roller 20 to clear the surface of flange 42 of idler roller 23. The surface of cylindrical sleeve 25 of driven roller 22 should be sufficiently long to contact with flanges 41 and 42 of idler roller 23. When assembled, the front ends of rollers 20, 21, 22, and 23 should preferably lie within approximately the same vertical plane, as shown in Figure 2.

Brackets 54 and 44 are mounted upon opposite sides of collecting roller 20 and idler roller 23. These brackets are disposed in this manner so as to leave free of any obstruction that side of the collecting roller 20 and that side of idler roller 23 which is moving upward. The arrows in Figure 1 illustrate this relationship. This arrangement makes it possible for the operator in threading up the rollers to bring his hand freely around that side of the collecting roller 20 or idler roller 23 with which the thread is to contact.

The frusto-conical ends of the several rollers facilitate threading up when operations are being started. After an empty cylindrical sleeve 47 has been placed between end pieces 49 and 50 of collecting roller 20 in readiness for the collection of thread, the thread is drawn from coagulating bath 16 and is rapidly passed around the conical ends of rollers 21, 22 and 23 and collecting roller 20. Thus the thread is withdrawn from coagulating bath 16, passed over the frusto-conical portion of pressure roller 21, and brought down between pressure roller 21 and driven roller 22. The thread is then brought around the under side of the frusto-conical portion of driven roller 22, and upward between driven roller 22 and idler roller 23. It is next led around the side of idler roller 23 opposite bracket 44, over idler roller 23, and into contact with the side of the frusto-conical portion of collecting roller 20 opposite bracket 54. Rotation of the rollers advances the thread from one to the other and winds it upon the frusto-conical portion of collecting roller 20.

The operation of threading up the rollers could be accomplished if the frusto-conical surfaces above described were not present but somewhat less readily than if frusto-conical surfaces are employed, this in consequence of the contact which exists between the cylindrical surfaces of the several rollers as a result of the fact that they bear directly upon each other. The frusto-conical formation of the ends of the several rollers not only permits the operator access between them to enable him to place the thread upon their surfaces, but also provides an entrance surface over which the thread may be conducted while being led to the cylindrical portions of the several rollers. The threading up operation is also facilitated by the disposition of brackets 44 and 54 on opposite sides of the rollers which they respectively support.

To bring the thread from the frusto-conical portions of the rollers to the cylindrical portions thereof the thread may conveniently be hooked in the eye 58 of conventional traverse arm 59. Inasmuch as the limits of travel of eye 58 correspond to the ends of the package of thread which is to be built up on collecting roller 20, the thread will be advanced back and forth only along the cylindrical portion of pressure roller 21. The thread will be wound on collecting roller 20 in the manner in which it is laid upon pressure roller 21, since the wet thread cannot slip sidewise across the several rollers.

As the thread builds up on the surface of sleeve 47 of collecting roller 20, the thread is at all times in contact with the surface of cylindrical sleeve 40 of idler roller 23, so that the package of thread and therefore collecting roller 20 are rotated. Due to this direct contact, the surface of the package of thread moves at the same peripheral speed as the peripheral speed of the surface of cylindrical sleeve 40 of idler roller 23. Because of this relationship, the thread is collected on the package at the same speed with which it is supplied from idler roller 23.

The thread is consequently wound upon sleeve 47 of collecting roller 20 with the same degree of tension or slackness that it has in passing around idler roller 23, this being that which is imparted to the thread in passing between rollers 22 and 23. To decrease the tension in the thread being collected on sleeve 47 of collecting roller 20 the diameter of flanges 41 and 42 may be increased or the diameter of cylindrical sleeve 40 of idler roller 23 decreased; to increase it, the diameter of flanges 41 and 42 may be decreased or the diameter of cylindrical sleeve 40 increased.

In the modification of the invention illustrated in Figures 6 and 7, two idler rollers 61 and 62 are located between driven roller 63 and collecting roller 64. Idler roller 62 and collecting roller 64 have the same general formation and relation to each other as idler roller 23 and collecting roller 20 in Figures 1 and 2, idler roller 62 having flanges 65 at both ends of its cylindrical surface. Bracket 66, which carries idler roller 62, is pivotally mounted upon rail 67 extending longitudinally of the spinning machine. Bracket 66 is so positioned with respect to idler roller 62 as to be adjacent that portion of the periphery of said roller which is not contacted by the thread. In this manner, obstruction to the passage of the thread in the threading up operation is eliminated.

Bracket 68 for the front end of collecting roller 64 is disposed upon the side thereof opposite the side of idler roller 62 on which bracket 66 is mounted.

Idler roller 61 is formed similarly to driven roller 22 of Figures 1 and 2 in that it is not provided with flanges. It is rotated through contact with driven roller 63. To support idler roller 61, a pivoted bracket 69 is mounted upon a rail 70 which corresponds generally to rail 37 in Figures 1 and 2. Bracket 69 is mounted upon the side of idler roller 61 upon which is mounted bracket 68 for collecting roller 64 with the result that bracket 69 is on the downwardly moving side of idler roller 61.

Driven roller 63 may be mounted upon shaft 19 of Figures 1 and 2. In contrast with driven roller 22, however, driven roller 63 is provided at opposite ends of its cylindrical surface with flanges 71 and in this respect corresponds to idler roller 62. Bearing upon the cylindrical surface of driven roller 63 is a pressure roller 72. The latter may be supported in a manner similar to pressure roller 21 in Figures 1 and 2 and may be of similar construction. The conical end portion 73 of pressure roller 72 must, however, be of sufficiently small diameter at its base to prevent interference with the flange 71 at the front end of driven roller 63. This relationship is shown in detail in Figure 8.

The cylindrical surface of idler roller 61 bears directly upon flanges 71 of driven roller 63 and through this frictional contact idler roller 61 is rotated. Because of this contact, the cylindrical surface of idler roller 61 will have a greater peripheral speed than the cylindrical surface of driven roller 63 and as a result the thread passing between these two rollers will be placed under tension. By varying the ratio between the diameter of flanges 71 and the diameter of the cylindrical surface of driven roller 63, any desired degree of tension may be imparted to the thread. This arrangement may be used in cases in which it is desirable to stretch the thread immediately after coagulation.

In passing from idler roller 61 to idler roller 62, the thread is relieved of tension due to the fact that the cylindrical surface of idler roller 62 is of smaller diameter than the diameter of its end flanges 65. By properly proportioning the ratio between the cylindrical surface of idler roller 62 and its end flanges 65, any desired amount of slack may be imparted to the thread and this may be sufficient to compensate for the tension placed in the thread in passing from driven roller 63 to idler roller 61. In this manner, although subjected to a stretching operation, the thread gathered on collecting roller 64 forms a loose winding through which treating fluids may easily be passed.

Since rollers 61 and 62 are idler rollers, it is not necessary that they be of any predetermined diameter. To effect a desired tensioning or slackening of the thread, a different proportioning of the flanges of the roller with respect to its cylindrical surface is all that is required. For this reason, idler rollers 61 and 62 may be made of such small diameter that no increase in the height of the machine as shown in Figures 1 and 2 is necessary in order to accommodate several idler rollers.

Figures 9 and 10 show a pot-spinning machine embodying the invention. Thread is supplied from some suitable source such as spinnerets and spin troughs similar to those appearing in Figures 1 and 2. Spinning pot 74 is rotated at high speed by means of motor 75. The spinning machine is in general of the kind ordinarily employed in the pot-spinning system, but differs therefrom in the respects hereinafter mentioned.

In passing to spinning pot 74, the thread first travels around two rollers 76 and 77 each of which has two stepped cylindrical surfaces, the enlarged surface 78 of roller 77 being in engagement with the reduced surface 79 of roller 76 and the surfaces 80 and 81 of rollers 77 and 76, respectively, receiving the thread. These thread bearing surfaces 80 and 81 are so related to engaging surfaces 78 and 79 that the surfaces 80 and 81 are spaced from each other, a short length of free thread extending between them. Due to the relation between the engaging and the thread bearing surfaces of rollers 76 and 77, surface 81 moves at a higher peripheral speed than the peripheral speed of surface 80 with the result that thread passing between these two surfaces is tensioned. By increasing the diameter 79 of roller 76 and correspondingly decreasing the diameter of engaging surface 78 of roller 77, the peripheral speed of roller 77 will be increased with respect to that of roller 76, which is positively driven in the manner illustrated, and hence the tension in the thread passing therebetween may be increased.

As shown, roller 76 is supported upon a positively driven shaft 82 passing through a bearing in the frame 83 of the spinning machine. Shaft 84, upon which roller 77 is rotatably mounted, is carried by a bearing block 85. Bearing block 85 has grooves 87 therein enabling it to fit between opposite walls of a vertical slot 86 formed in the frame 83. This method of mounting permits an up-and-down movement of roller 77, compensating for inaccuracies in the engaging surfaces 79 and 78 of rollers 76 and 77 respectively and assuring frictional engagement between them.

Figure 13:
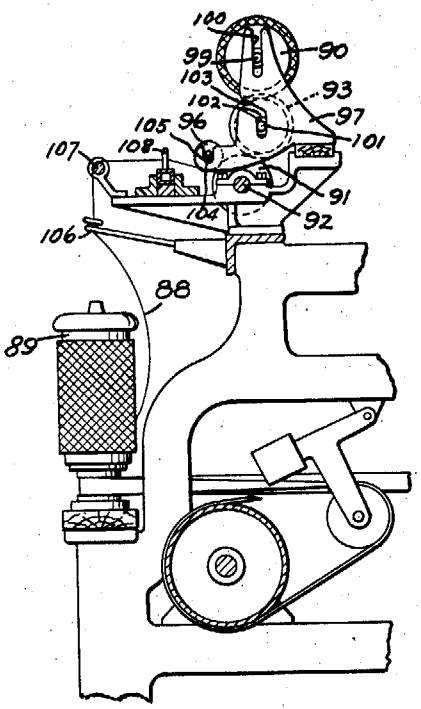
Figure 13 is a sectional elevation on line 13—13 of Figure 12.
Figure 14:
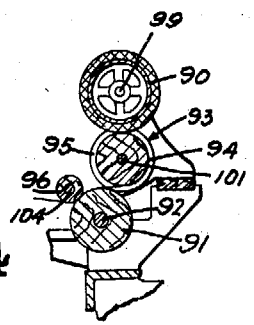
Figure 14 is a section on the line 14—14 of Figure 12.
Figure 12:
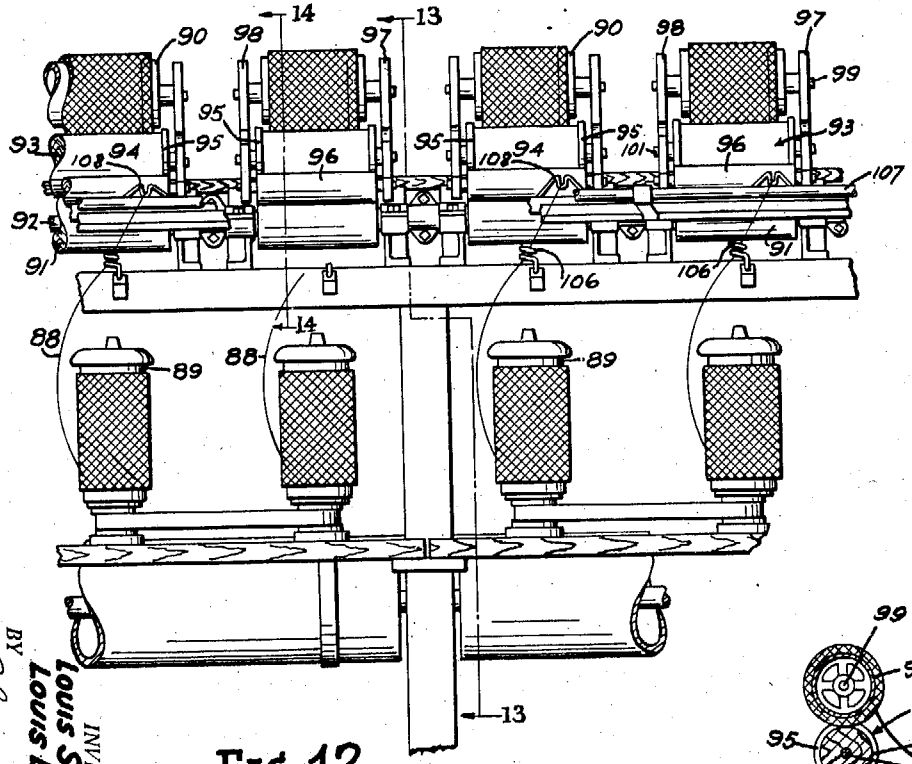
Figure 12 is a front elevation of a twisting machine embodying apparatus of the invention.

In Figures 12, 13 and 14, the invention is shown as applied to a twisting machine. Thread 88 from the rapidly rotating spool 89 is twisted and collected upon bobbin 90. The thread is drawn from the spool by means of a driven roller 91 carried upon a shaft 92 extending longitudinally of the twisting machine. Between the bobbin 90 and driven roller 91 is an idler roller 93 having a central cylindrically shaped surface 94 and end flanges 95. End flanges 95 bear upon the surface of driven roller 91, driving idler roller 93.

The surface of bobbin 90 or the surface of the package of thread which is wound thereon, as the case may be, bears on the cylindrical surface 94. Due to this contact, bobbin 90 is rotated. Surface 94 of idler roller 93 is rotated at a lower peripheral speed than the surface of driven roller 91 due to the presence of driving flanges 95 and as a result thread passing from driven roller 91 to idler roller 93 is relieved of tension. Inasmuch as the surface of bobbin 90 or the surface of the package of thread thereon, as the case may be, will be rotated at the same speed as surface 94, the thread is delivered to the bobbin 90 in untensioned condition.

To prevent slippage of thread on driven roller 91, the thread is forcibly applied to driven roller 91 by means of pressure roller 96. The presence of pressure roller 96 dispenses with the necessity of securing the long arc of contact between the thread and driven roller 91 that would otherwise be necessary to prevent slippage of the thread upon driven roller 91. Difficulty would be experienced, in attempting to obtain such a long arc of contact, in passing the thread around the under side of driven roller 91. Such difficulty results from the presence of shaft 92 throughout the length of the twisting machine.

The respective shafts of idler roller 93, pressure roller 96 and bobbin 90 are carried upon brackets 97 and 98 on opposite sides thereof. The shaft 99 of bobbin 90 is carried in vertical slots 100 at the uppermost part of brackets 97 and 98, such slots being of sufficient depth to permit the surface of bobbin 90 to come into direct contact with surface 94 as well as to permit shaft 99 to rise to the highest point to which it will be forced when the package of thread is thickest. Shaft 101 of idler roller 93 is carried in slots in brackets 97 and 98 having a vertical portion 102 and an inclined portion 103 leading to the forward edges of the brackets 97 and 98. The vertical portion 102 of the slot permits a limited up-and-down movement of roller 93 to compensate for inaccuracies in the erection of the machine and inclined portion 103 facilitates positioning of the shaft.

Shaft 104 of pressure roller 96 is carried in slots 105 of the brackets 97 and 98, slots 105 being located in such close relation to shaft 92 that the surface of pressure roller 96 bears of its own weight upon the surface of driven roller 91.

In threading up the twisting machine, the parts are preferably in a condition of rest, since this facilitates the threading up operation. Pressure roller 96 and idler roller 93 are first removed from brackets 97 and 98. Thread is then drawn from the spool 89 and passed through stationary eye 106, over slide bar 107 and through the guide eye 108. The thread is then wound with a few turns around bobbin 90 and the bobbin 90 allowed to fall to the lowest point permitted by slots 100. Idler roller 93 is then positioned between driven roller 91 and bobbin 90 by locating the ends of its shaft 101 in the slot portion 102. Shaft 104 of pressure roller 96 is then dropped into slots 105 to bring the thread forcibly against the surface of roller 91. The machine may then be set in operation.

The several embodiments of the invention which have been disclosed are intended to be representative of the various arrangements available in carrying out the invention. Thus the structural details appearing here are intended to be illustrative of the invention and not limitations upon its scope. The term "thread" as used in the appended claims comprehends not only thread per se, but such materials as filament bundles, ribbons, baffis, artificial horsehair, artificial straw, and, in fact, materials of all kinds capable of being handled by the apparatus to which the invention relates. It is intended that the patent shall cover, by suitable expression in the appended claims, whatever features of patentable novelty reside in the invention.

What is claimed is:

1. Apparatus for handling a relatively delicate thread at a linear speed which is substantially constant at given positions in the apparatus comprising means for supplying the thread; means to which the thread passes; and, disposed between said means, means for changing the tension in the thread including a rotatable member positively rotated at a constant speed having a thread-bearing surface of circular cross-section and, in contact therewith and driven therefrom, another rotatable member so disposed that its thread-bearing surface is out of contact with that of the first-named rotatable member, of which rotatable members at least one has associated therewith a driving portion which differs in diameter from the thread-bearing surface thereof, contacts and has driving engagement with the other of said rotatable members so that the peripheral speeds of the thread-bearing surfaces of said rotatable members are different, the thread first engaging the thread-bearing surface of the positively rotated member and thereafter contacting the thread-bearing surface of the other rotatable member in such manner that the thread-bearing surfaces of said rotatable members move in the direction of travel of the thread.

2. Apparatus for handling a relatively delicate thread comprising means for supplying thread at a substantially constant linear speed; means for collecting the thread in package form; and, disposed between said thread-supplying means and said thread-collecting means, means for changing the tension in the thread including a positively driven rotatable member the thread-bearing surface of which is circular in cross-section and, in contact therewith and driven therefrom, another rotatable member of circular cross-section so disposed that its thread-bearing surface is out of contact with that of the first-named rotatable member, of which rotatable members at least one has associated therewith a driving portion which differs in diameter from the thread-bearing surface thereof, contacts and has driving engagement with the other of said rotatable members so that the peripheral speeds of the thread-bearing surfaces of said rotatable members are different, the thread first engaging the thread-bearing surface of the positively driven member and thereafter contacting the thread-bearing surface of the other rotatable member in such manner that the thread-bearing surfaces of said rotatable members move in the direction of travel of the thread.

3. Tension controlling apparatus comprising rotatable members providing cylindrical thread bearing surfaces out of contact with each other, one of said members having a flanged enlargement extending into driving engagement with another of the members, and associated with said rotatable members conically shaped end portions merging into the driving portions thereof to enable passage of thread through said driving portions to said thread bearing portions.

4. Apparatus for collecting thread comprising two rotatable members each of which has a thread-bearing surface of circular cross section and an associated driving portion, the driving portion of at least one of which rotatable members is of a diameter which differs from that of the thread-bearing surface thereof, said rotatable members being mounted so that their thread-bearing surfaces do not contact while the driving portions do contact to provide driving engagement, the thread thereby contacting the thread-bearing surfaces of both of said rotatable members in succession in such manner that the thread-bearing surfaces of said rotatable members move in the direction of travel of the thread; a core on which the thread is collected in package form mounted to bear against and have driving engagement with the thread-bearing surface of the last of said rotatable members contacted by the thread; and a reciprocatory traverse guide which engages the thread before it passes to the first of said rotatable members contacted by the thread and is mounted in close proximity thereto.

5. Apparatus for collecting thread comprising two rotatable members each of which has a thread-bearing surface of circular cross section and an associated driving portion, the driving portion of at least one of which rotatable members is of a diameter which differs from that of the thread-bearing surface thereof, said rotatable members being mounted so that their thread-bearing surfaces are out of contact while the driving portions thereof contact to provide driving engagement, the thread thereby contacting the thread-bearing surfaces of both of said rotatable members in succession in such manner that the thread-bearing surfaces of said rotatable members move in the direction of travel of the thread; a core on which the thread is collected in package form mounted in close proximity to the last rotatable member contacted by the thread; and a reciprocatory traverse guide which engages the thread before it passes to the first of said rotatable members contacted by the thread and is mounted in close proximity thereto.

6. Apparatus for collecting thread comprising a first rotatable member which has a longitudinally extending generally cylindrical thread-bearing surface; a second rotatable member which has a longitudinally extending generally cylindrical thread-bearing surface and portions of a diameter larger than that of said thread-bearing surface at the ends thereof which contact said first mentioned rotatable member and have driving engagement therewith so that the thread-bearing surfaces of both said rotatable members are maintained out of contact with each other and move at different peripheral speeds; and a core on which the thread is wound in package form mounted to bear against and have driving engagement with the thread-bearing surface of said second rotatable member between the enlarged portions thereof.

7. Apparatus for collecting thread comprising a first rotatable member which has a longitudinally extending generally cylindrical thread-bearing surface; a second rotatable member which has a longitudinally extending generally cylindrical thread-bearing surface and portions of a diameter larger than that of said thread-bearing surface at the ends thereof which contact said first-mentioned rotatable member and have driving engagement therewith so that the thread-bearing surfaces of both said rotatable members are maintained out of contact with each other and move at different peripheral speeds; a core on which the thread is wound in package form mounted to bear against and have driving engagement with the thread-bearing surface of said second rotatable member between the enlarged portions thereof; a reciprocatory traverse guide which engages the thread before it passes to said first rotatable member; and means for reciprocating said traverse guide through a path such that the thread moves longitudinally over the thread-bearing surface of said second rotatable member between the enlarged portions thereof.

8. Apparatus for collecting thread comprising a plurality of rotatable members, of which successive rotatable members contact and are in driving engagement, which rotatable members the thread contacts in succession so that the surface of each of said rotatable members contacted by the thread moves in the direction of travel of the thread, the last of which rotatable members constitutes a collecting device for collecting the thread in package form, each of said rotatable members having a longitudinally extending thread-bearing surface of circular cross section, at least one of which rotatable members has spaced, flange portions thereon of a diameter larger than that of the thread-bearing surface of said rotatable member and contacts an adjacent rotatable member so that the thread-bearing surfaces of said adjacent rotatable members are maintained out of contact with each other and move at different peripheral speeds; a reciprocatory traverse guide which engages the thread before it passes to the first of said rotatable members; and means for reciprocating said traverse guide through a path such that the thread moves longitudinally over the thread-bearing surface of said flanged rotatable member between the flange portions thereof.

9. Apparatus for collecting thread comprising a plurality of rotatable members of which successive members contact and are in driving engagement, the thread contacting in successions said rotatable members so that the surface of each of said rotatable members moves in the direction of travel of the thread, each of said rotatable members having a longitudinally extending generally cylindrical thread-bearing surface at least one of which rotatable members comprises spaced flange portions at the ends of its thread-bearing surface, said flange portions contacting and being in driving engagement with an adjacent rotatable member, whereby the thread-bearing portions of said adjacent rotatable members are maintained out of contact with each other and move at different periphery speeds; a reciprocatory traverse guide engaging the thread before it passes to the first of said rotatable members; means for reciprocating said traverse guide through a path such that the thread moves longitudinally over the thread-bearing surface of said flanged rotatable member between the flange portions of said rotatable member; and a rotatable core mounted in close proximity to the last of said rotatable members for collecting the thread in cross wound package form.

10. Tension-controlling apparatus comprising two rotatable members each having a thread-bearing surface of substantially circular cross section one of which rotatable members has an enlarged portion of a diameter larger than that of the thread-bearing surface of said rotatable member and the other of which rotatable members has a reduced portion of a diameter smaller than that of the thread-bearing portion of said member, said enlarged and reduced portions of said rotatable members contacting each other and providing driving engagement, whereby the thread-bearing surfaces of said rotatable members are maintained out of contact with each other and move at different peripheral speeds during rotation of said rotatable members.

11. In a process in which plastic filaments are passed through a reciprocating guide and wound as a cake on a rotating bobbin, the improvement which comprises passing the filaments moving from the guide to the bobbin against a surface moving in the direction of passage of the filaments at a speed that is substantially higher than the peripheral speed of the cake, transmitting power from the moving surface to the filaments and thereby accelerating the filaments, while moving the filaments back and forth across the surface transverse to their direction of passage, whereby tension in the filaments at the point of winding on the bobbin is reduced.

12. In a process in which relatively plastic rayon filaments are passed through a guide reciprocating transversely to the direction of passage of the filaments and wound on a rotating annular surface as a series of overlapping spirals, the improvement which comprises immediately before the winding passing the filaments between the guide and said surface against a second annular surface rotating in the direction of passage of the filaments with a peripheral speed higher than that of the first annular surface, transmitting power from the moving surface to the filaments and thereby accelerating the filaments while moving the filaments back and forth across the surface transverse to the direction of passage of the filaments, whereby the tension of the filaments being wound is reduced.

13. In a process in which relatively plastic rayon filaments are passed through a guide reciprocating transversely to the direction of passage of the filaments and wound as a series of overlapping spirals on a rotating collector, the improvement which comprises pressing the filaments passing from the guide to the collector against a surface moving in the direction of passage of the filaments at a speed in excess of that attained by the filaments at the point of winding, said pressing being conducted with a force sufficient to bring about the transmission of power from the moving surface to the filaments and thereby impart acceleration to the filaments, and simultaneously moving the filaments back and forth across said surface transverse to the direction of filament passage, whereby tension in the filaments being wound is reduced.

14. In a process in which plastic rayon filaments are passed through a guide reciprocated transversely to the direction of passage of the filaments and wound as a cake on a collector, the improvement which comprises bending the filaments passing from the guide to the collector over a cylindrical surface rotating in the direction of passage of the filaments at a speed in excess of that attained by the filaments at the point where they are incorporated in the cake, the frictional coefficient of the moving surface and the force with which the filaments are bent over the moving cylindrical surface being such that power is transmitted from the surface to the filaments and the latter are accelerated and become relatively untensed as they pass to the collector while moving the filaments back and forth across the surface in a direction transverse to that of the moving filaments.

15. In a process in which relatively plastic rayon filaments are passed through a guide reciprocated transversely to the direction of passage of the filaments and wound around a rotating collector, the improvement which comprises passing the filaments between the guide and the collector at least partially around a cylinder disposed with its axis transverse to the direction of passage and rotated in the direction of passage of the filaments at a higher peripheral speed than that of the collector while moving the filaments back and forth across the cylinder in the direction of its axis of rotation, transmitting power from the cylinder to the filaments so that the filaments are accelerated during their contact with the cylinder and are in substantially slack condition when wound on the collector as a series of overlapping spirals.

16. In apparatus for winding plastic rayon filaments, the combination which comprises a rotatable bobbin upon which the filaments are wound, means for rotating the bobbin, a guide through which the filaments pass on their way to the bobbin, said guide being reciprocable through a stroke in a direction transverse to that of filament passage and substantially parallel to the axis of rotation of the bobbin, a godet disposed in the path of the filaments from the guide to the bobbin, said godet having a cylindrical surface at least as long as the stroke of the guide and being rotatable around an axis substantially parallel to that of the bobbin, and means for rotating the godet at a peripheral speed in excess of that of the bobbin, the coefficient of friction between the filaments and the cylindrical surface being such that the higher peripheral speed of the cylindrical surface is transmitted at least in part to the filaments.

17. In a process in which plastic filaments are passed through a reciprocating guide and wound as a cake on the rotating bobbin, the improvement which comprises passing the filaments back and forth over a roller that is disposed between the guide and the bobbin with its axis of rotation substantially parallel to the bobbin and positively driven at a faster peripheral speed than that of the cake and thus relieving winding tension on the bobbin, whereby variations in tension in successive portions of the filaments being wound tend to be equalized and variations in denier due to stretching of the filaments minimized.

18. In apparatus for winding plastic filaments, the combination which comprises a rotatable bobbin upon which the filaments are wound, means for rotating the bobbin, a guide through which the filaments pass on their way to the bobbin, said guide being reciprocable through a stroke transverse to the direction of passage of the filaments, a godet so disposed in the path of the filaments from the guide to the bobbin that the filaments bear against the godet, and means for rotating the godet in the direction of filament passage at a peripheral speed substantially in excess of that of the bobbin, the coefficient of friction of the godet being such that the higher peripheral speed thereof is transmitted at least in part to the filaments.

19. In apparatus for winding plastic filaments, the combination which comprises a rotatable bobbin upon which the filaments are wound, means for rotating the bobbin, a guide through which the filaments pass on their way to the bobbin, said guide being reciprocable through a stroke transverse to the direction of passage of the filaments, a godet disposed with its axis of rotation substantially parallel to that of the bobbin and having a rotating surface (against which the filaments bear) at least as long as the stroke of the reciprocable guide, and means for rotating the godet in the direction of filament passage at a peripheral speed substantially in excess of that of the bobbin, the coefficient of friction of the godet being such that the higher peripheral speed thereof is transmitted at least in part to the filaments.

LOUIS S. FRYER.
LOUIS E. LOVETT.